(12) United States Patent
Ota et al.

(10) Patent No.: US 7,670,712 B2
(45) Date of Patent: Mar. 2, 2010

(54) METAL OXYNITRIDE ELECTRODE CATALYST

(75) Inventors: Kenichiro Ota, Koganei (JP); Nobuyuki Kamiya, Yokohama (JP); Shigenori Mitsushima, Kamakura (JP); Akimitsu Ishihara, Hiratsuka (JP); Kazunari Doumen, Sagamihara (JP); Michikazu Hara, Yokohama (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 10/581,210

(22) PCT Filed: Nov. 30, 2004

(86) PCT No.: PCT/JP2004/017801

§ 371 (c)(1),
(2), (4) Date: Jun. 1, 2006

(87) PCT Pub. No.: WO2005/053840

PCT Pub. Date: Jun. 16, 2005

(65) Prior Publication Data

US 2007/0128884 A1    Jun. 7, 2007

(30) Foreign Application Priority Data

Dec. 2, 2003  (JP) .............................. 2003-403653

(51) Int. Cl.
*H01M 4/90* (2006.01)
(52) U.S. Cl. .............................. 429/40; 429/12; 429/30; 429/33; 429/41
(58) Field of Classification Search .................. 205/50; 429/9–19, 30–34, 40–44
See application file for complete search history.

(56) References Cited

U.S. PATENT DOCUMENTS

| | | | | |
|---|---|---|---|---|
| 4,399,008 A | * | 8/1983 | Ray | 205/387 |
| 4,454,015 A | * | 6/1984 | Ray et al. | 204/293 |
| 4,455,211 A | * | 6/1984 | Ray et al. | 204/293 |
| 4,582,585 A | * | 4/1986 | Ray | 204/247.4 |
| 4,584,172 A | * | 4/1986 | Ray et al. | 419/34 |
| 4,677,092 A | * | 6/1987 | Luczak et al. | 502/185 |
| 5,024,905 A | * | 6/1991 | Itoh et al. | 429/44 |
| 5,183,713 A | * | 2/1993 | Kunz | 429/44 |
| 5,364,522 A | * | 11/1994 | Wang | 205/50 |
| 5,374,342 A | * | 12/1994 | Sekhar | 204/247.3 |
| 5,378,327 A | * | 1/1995 | Sekhar et al. | 205/380 |
| 5,397,450 A | * | 3/1995 | Sekhar et al. | 204/243.1 |
| 5,980,977 A | * | 11/1999 | Deng et al. | 427/79 |
| 6,190,802 B1 | * | 2/2001 | Clerc et al. | 429/231.2 |
| 6,297,185 B1 | * | 10/2001 | Thompson et al. | 502/101 |
| 6,531,704 B2 | * | 3/2003 | Yadav et al. | 250/493.1 |
| 2003/0059666 A1 | * | 3/2003 | Kourtakis | 429/40 |
| 2006/0016371 A1 | * | 1/2006 | Yadav | 106/400 |

FOREIGN PATENT DOCUMENTS

| | | |
|---|---|---|
| JP | 2000-048833 A | 2/2000 |
| JP | 2001-205104 A | 7/2001 |
| JP | 2002-66333 A | 3/2002 |
| JP | 2002-154823 A | 5/2002 |
| JP | 2002-321907 A | 11/2002 |
| JP | 2004-303664 A | 10/2004 |

OTHER PUBLICATIONS

Wang-Jae Chun et al., "Conduction and Valance Band Positions of . . .", J.Phys.Chem.B., Feb. 27, 2003, vol. 107, No. 8, pp. 1798-1803.
Michikazu Hara et al., "TaON and Ta$_3$N$_5$ as new visible light driven photocatalysts", Catalysis Today 78 (2003) pp. 555-560.
International Search Report mailed Mar. 22, 2005 of International Application PCT/JP2004/017801.

* cited by examiner

*Primary Examiner*—Dung A. Le
(74) *Attorney, Agent, or Firm*—Westerman, Hattori, Daniels & Adrian, LLP

(57) ABSTRACT

An electrode catalyst that maintains catalytic activity under conditions of an electrode potential as high as 0.4 V or above and exhibits improved stability. The metal oxynitride electrode catalyst is composed of an oxynitride containing at least one transition metal element selected from the group consisting of La, Ta, Nb, Ti, and Zr, the metal oxynitride electrode catalyst being used at a potential of 0.4 V or higher relative to the reversible hydrogen electrode potential in an acidic electrolyte. The metal oxynitride electrode catalyst is useful as an electrode catalyst for electrochemical systems used in acidic electrolytes in the fields of water electrolysis, organic electrolysis, fuel cells, etc.

2 Claims, 2 Drawing Sheets

METAL OXYNITRIDE ELECTRODE CATALYST

BACKGROUND OF THE INVENTION

1. Field of the Invention

The present invention relates to electrode catalysts for electrochemical systems used in acidic electrolytes in the fields of water electrolysis, organic electrolysis, fuel cells, etc.

2. Related Art

Noble metals, in particular, platinum, are stable at high electrical potentials and have high catalytic activity for various reactions, and thus are used as electrode catalysts for various electrochemical systems. However, because of the high cost and limited reserves of platinum and since electrode catalysts having higher activity are required for fuel cells, alternative materials to platinum catalysts have been desired.

Metal oxynitrides have been developed as photocatalysts that decompose water under visible light (e.g., Non-Patent Document 1 and Patent Document 1). However, there have been no attempts to use metal oxynitrides as electrode catalysts.

Non-Patent Document 1: M. Hara et al., Catal. Today., 78, 555 (2003)

Patent Document 1: Japanese Unexamined Patent Application Publication No. 2001-205104

Patent Document 2: Japanese Unexamined Patent Application Publication No. 2002-66333

Patent Document 3: Japanese Unexamined Patent Application Publication No. 2002-154823

Patent Document 4: Japanese Unexamined Patent Application Publication No. 2002-321907

DISCLOSURE OF INVENTION

Problems to be Solved by the Invention

It has been reported that, in general, carbides and many other non-platinum-based compounds are activated and dissolved and cannot be stably present in an acidic electrolyte under conditions of an electrode potential as high as 0.4 V or above (Hiroshi Yoneyama et al., *Denkikagaku*, 41, 719 (1973)). Thus, the application range of these compounds as an electrode catalyst is limited to low electrode potentials. There has been need for development of an electrode catalyst that maintains catalytic activity under these conditions and exhibits improved stability.

SUMMARY OF THE INVENTION

The present invention provides an electrode catalyst composed of an oxynitride containing at least one transition metal selected from the group consisting of La, Ta, Nb, Ti, and Zr. The present inventors have found that the metal oxynitrides can exhibit corrosion resistance such that they are not dissolved even if used at a potential of 0.4 V or higher relative to the reversible hydrogen electrode potential in an acidic electrolyte.

That is, according to the present invention, (1) a metal oxynitride electrode catalyst includes an oxynitride containing at least one transition metal element selected from the group consisting of La, Ta, Nb, Ti, and Zr and is used at a potential of 0.4 V or higher relative to the reversible hydrogen electrode potential in an acidic electrolyte.

Furthermore, according to the present invention, (2) the metal oxynitride electrode catalyst is dispersed as fine particles on a catalyst carrier which is an electronically conductive powder.

Furthermore, according to the present invention, (3) the metal oxynitride electrode catalyst is used as an electrode catalyst for fuel cells using an acidic electrolyte.

ADVANTAGES

A metal oxynitride electrode catalyst of the present invention exhibits high corrosion resistance in an acidic electrolyte at a high electrode potential and also has oxygen reduction catalytic activity.

DETAILED DESCRIPTION OF THE INVENTION

Figure 1:
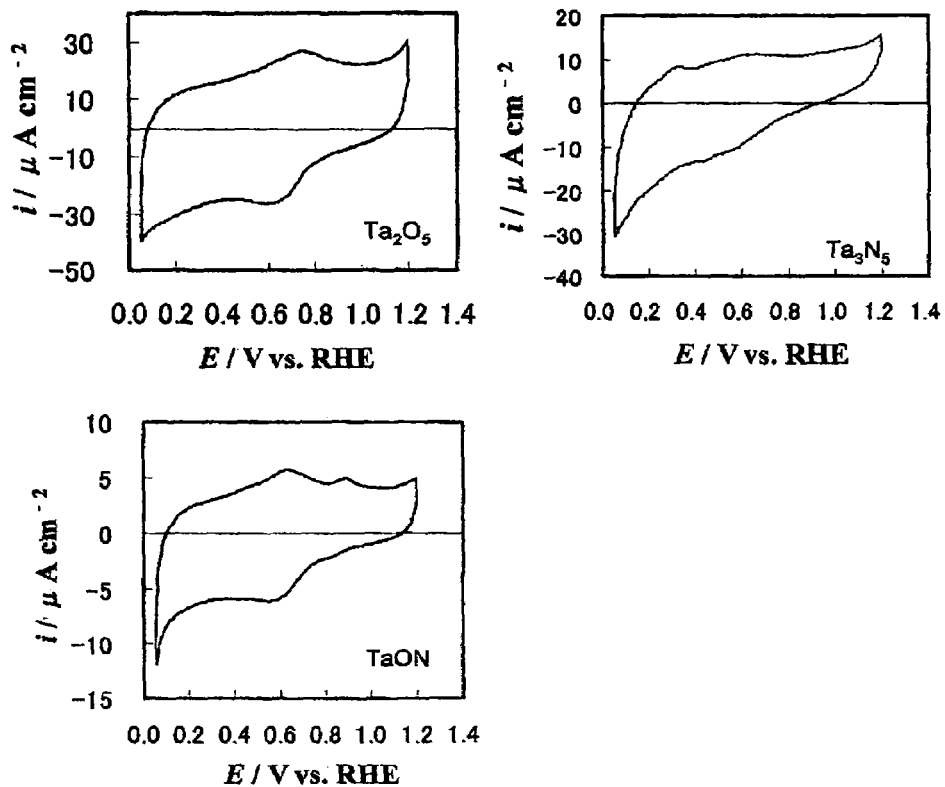
FIG. 1 includes graphs showing current-potential curves in a nitrogen atmosphere with respect to the electrode catalysts of Comparative Examples 1 and 2 and Example 1.

An electrode catalyst of the present invention is composed of an oxynitride containing at least one transition metal element selected from the group consisting of La, Ta, Nb, Ti, and Zr and can be used at a potential of 0.4 V or higher relative to the reversible hydrogen electrode potential in an acidic electrolyte, and thus the electrode catalyst is useful as an oxygen reduction catalyst. The upper limit of the potential depends on the stability of the electrode, and the electrode catalyst can be used at a potential of up to about 1.6 V relative to the potential at which oxygen is generated. If the potential exceeds 1.6 V, simultaneously with the generation of oxygen from the surface of the oxynitride, the oxynitride is gradually oxidized to an oxide. If the potential is less than 0.4 V, although there is no problem from the standpoint of stability of the oxynitride, usefulness of the oxynitride is low from the standpoint of it being used as an oxygen reduction catalyst.

Each of the transition metals La, Ta, Nb, Ti, and Zr is not eroded and is stable in an acidic electrolyte at high potentials, and since an oxide thereof constitutes the surface of the catalyst, the catalyst itself can be stably present. However, such an oxide does not have oxygen reduction catalytic activity. By partially nitriding the oxide to form an oxynitride, the electronic state continuously changes, and at a certain degree of nitriding, catalytic activity is believed to be exhibited. In general, catalytic activity at a transition metal:oxygen:nitrogen atomic ratio of about $1\pm0.1:1\pm0.1:1\pm0.1$ is desirable.

The metal oxynitride electrode catalyst of the present invention may be used by being dispersed as fine particles on a catalyst carrier which is an electronically conductive powder of carbon, a conductive oxide such as tungsten oxide or iridium oxide, or the like.

In order to produce the metal oxynitride electrode catalyst of the present invention, at least one metal oxide is used as a starting metal compound and a single metal compound or a mixture of metal compounds is allowed to react with ammonia, an ammonium salt, hydrazine, nitrogen, a metal nitride, a metal amide, a metal amine complex, or the like to perform synthesis. The reaction may be carried out using an appropriate method, for example, a method in which a powdered mixture of a starting metal compound and a nitrogen-containing compound is heated, or a method in which the surface of a starting metal plate is oxidized to form a starting metal oxide, and only the surface thereof is partially nitrided with nitrogen or a nitrogen-containing compound.

When a metal salt or a metal complex is used as a starting material, preferably, prior to nitriding, a metal oxide is formed as a precursor, for example, by a method in which the starting material is dissolved in an organic solvent, such as an alcohol, and subjected to heat treatment at a temperature of 923 K in air for 2 hours.

When a powdery metal compound is used as a starting material, since the size of the resulting metal oxynitride fine particles substantially depends on the size of the starting material powder, by adjusting the size of the starting material powder, fine particles with a desired size can be obtained.

The reaction temperature is in a range of 673 K to 1,473 K. If the temperature is lower than 673 K, the reaction rate is low and the reaction does not proceed. Although the reaction proceeds if a long time is taken, nitriding of the inner portion does not easily proceed compared with the degree of nitriding of the peripheral portion that is easily brought into contact with the nitrogen-containing compound of the starting metal oxide. Thus, the degree of nitriding differs depending on the location and it is difficult to obtain a uniformly nitrided product. If the temperature is higher than 1,473 K, decomposition occurs and an oxynitride is not formed.

During the reaction, if nitriding is allowed to proceed completely, a complete nitride is formed. The complete nitride is stable, but has low oxygen reduction catalytic activity. An oxynitride containing both oxygen and nitrogen in the middle of nitriding using a metal compound as a starting material only exhibits oxygen reduction catalytic activity. For example, in the case of Ta (tantalum), the nitrogen content of starting tantalum oxide is 0 percent by weight, the nitrogen content of completely nitrided tantalum nitride is 11 percent by weight, and the nitrogen content of tantalum oxynitride having oxygen reduction catalytic activity is about 6 to 9 percent by weight.

In particular, reaction between a metal oxide and ammonia is advantageous as the synthesis method of the electrode catalyst of the present invention. In the reaction, as nitriding proceeds, oxygen is liberated. Thus, ammonia serves as both a reducing agent and a nitriding agent. By changing the feed rate of ammonia and the reaction temperature, the degree of nitriding can be controlled.

During the reaction, by using a mixed gas of water vapor and nitrogen in addition to ammonia to change the partial pressure of ammonia and decrease the nitriding rate, it is possible to easily obtain a uniformly nitrided oxynitride in which the difference in the degree of nitriding depending on the location is small.

EXAMPLES

Example 1

A tantalum oxide $Ta_2O_5$ powder (manufactured by KOJUNDO CHEMICAL LABORATORY CO., LTD., purity 99.9%, average particle size 0.5 μm) was used as a starting material, enveloped in quartz wool so as to readily pass ammonia gas, and retained in a reaction tube. A mixed gas of ammonia (purity 99.999%), water vapor, and nitrogen was introduced into the reaction tube and left to stand until the gas flow became substantially steady (for about 60 minutes). Subsequently, nitriding was performed at 850° C. (heating rate: 10° C./min), and the introduction of the mixed gas was stopped before nitriding completely proceeded. A tantalum oxynitride powder with a size of several hundred nanometers was obtained.

Comparative Example 1

A $Ta_2O_5$ powder which was not nitrided was used as a sample.

Comparative Example 2

A $Ta_2O_5$ powder was used as a starting material as in Example 1, and a $Ta_3N_5$ power in which nitriding was allowed to completely proceed was prepared.

The tantalum oxynitride powder prepared in Example 1, the $Ta_2O_5$ powder of Comparative Example 1, and the $Ta_3N_5$ power prepared in Comparative Example 2 were each applied to a glassy carbon electrode (diameter: 5.2 mm), and Nafion (Registered Trademark) coating was performed. When the catalyst was applied, 0.1 g of the catalyst was mixed in 5 ml of water so as to enable equivalent coating. Then, stirring and suspending were performed by ultrasonic waves to prepare a solution, and 30 μl of the solution was applied so that the catalyst was uniformly dispersed. The glassy carbon electrode applied with the catalyst was immersed in 0.1 mol/dm$^3$ of a sulfuric acid solution, and an experiment was conducted at 30° C. at atmospheric pressure. The experiment was conducted both in a nitrogen gas atmosphere and in an oxygen gas atmosphere. As a reference electrode, a reversible hydrogen electrode was used in a sulfuric acid solution with the same concentration. The current density was measured in terms of geometric area.

FIG. 1 shows a current-potential curve of the resulting tantalum oxynitride at a reaction temperature of 30° C. in a nitrogen atmosphere when scanning was performed at 50 mV/s at a potential in a range of 0.05 to 1.2 V. The results in Comparative Examples 1 and 2 are also shown. As is evident from FIG. 1, in each case, even if scanning of potential is repeated, the shape of the curve is not changed and the stable presence in the sulfuric acid solution is confirmed.

Figure 2:
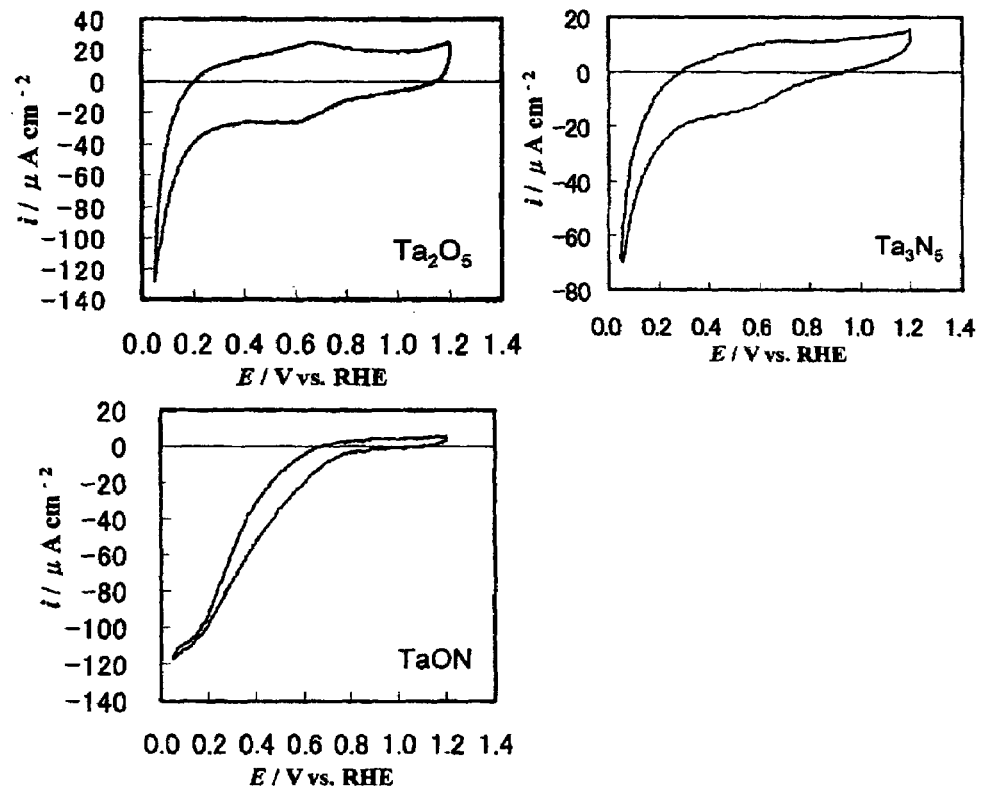
FIG. 2 includes graphs evaluating the catalytic activity of oxygen reduction reaction of the electrode catalysts of Comparative Examples 1 and 2 and Example 1.

FIG. 2 shows current-potential curves in an oxygen atmosphere under similar conditions. In each of Comparative Examples 1 and 2, an oxygen reduction current is observed at 0.2 V or less. Thus, the oxygen reduction catalytic activity thereof is considered to be significantly low. In contrast, in Example 1, reduction current is observed in the vicinity of 0.8 V or less, which means the presence of oxygen reduction catalytic activity.

Figure 3:
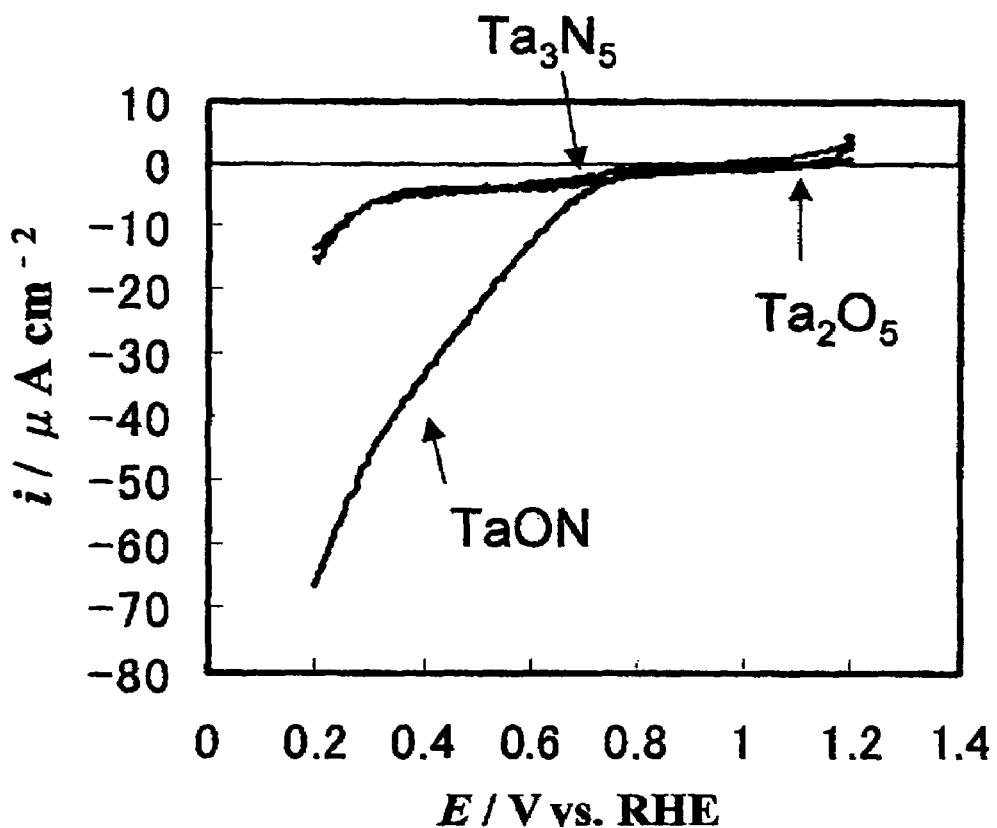
FIG. 3 is a graph evaluating the catalytic activity of oxygen reduction reaction of the electrode catalyst of Example 1.

FIG. 3 shows current-potential curves when the potential was scanned from 1.2 V in the negative direction at a scanning rate of 5 mV/s at a reaction temperature of 30° C. in an oxygen atmosphere. In Comparative Examples 1 and 2, the oxygen reduction current is observed in the vicinity of 0.3 V or less. In contrast, in Example 1, the oxygen reduction current is observed at 0.8 V or less, indicating the presence of excellent oxygen reduction catalytic activity.

Figure 4:
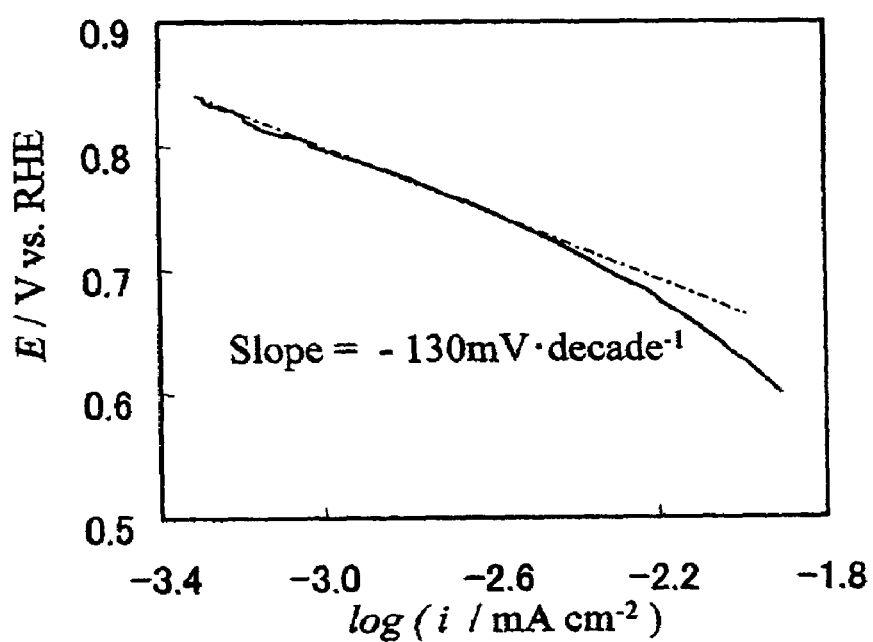
FIG. 4 is a graph estimating the number of reaction electrons in the rate-determining step in the oxygen reduction reaction of Example 1.

FIG. 4 shows the relationship between the logarithm of the oxygen reduction current density of TaON obtained by the method of Example 1 and the electrode potential. It is possible to obtain the number of reaction electrons in the rate-determining step of the reaction from the slope of the inclined line in FIG. 4. FIG. 4 shows that the slope of the inclined line is −130 mV/decade, on the basis of which the number of reaction electrons is estimated to be one. That is, the rate-determining step involves one electron reaction.

INDUSTRIAL APPLICABILITY

The metal oxynitride electrode catalysts of the present invention are useful as electrode catalysts for electrochemical systems used in acidic electrolytes in the fields of water electrolysis, organic electrolysis, fuel cells, etc.

What is claimed is:

1. A membrane electrolyte assembly for a fuel cell, comprising:

an electrode including an oxygen reduction electrode catalyst comprising an oxynitride containing Ta, wherein atomic ratio of (tantalum):(oxygen):(nitrogen) is $(1\pm0.1):(1\pm0.1):(1\pm0.1)$; and an acidic electrolyte contacting said oxygen reduction electrode catalyst, wherein said oxygen reduction electrode catalyst having an oxygen reduction catalytic activity at a potential of 0.4 V or higher relative to the reversible hydrogen electrode potential in said acidic electrolyte.

2. The membrane electrolyte assembly according to claim 1, wherein the oxygen reduction electrode catalyst is dispersed as fine particles on a catalyst carrier which is an electronically conductive powder.

* * * * *